(12) United States Patent
Van Adrichem

(10) Patent No.: US 7,913,450 B2
(45) Date of Patent: Mar. 29, 2011

(54) ADMINISTERING SUBSTANCES TO PLANTS BY INJECTION INTO THE SUBSTRATE

(75) Inventor: John Van Adrichem, De Lier (NL)

(73) Assignee: Precision Drip B.V., DeLier (NL)

( * ) Notice: Subject to any disclaimer, the term of this patent is extended or adjusted under 35 U.S.C. 154(b) by 41 days.

(21) Appl. No.: 12/394,902

(22) Filed: Feb. 27, 2009

(65) Prior Publication Data

US 2009/0241414 A1  Oct. 1, 2009

Related U.S. Application Data

(63) Continuation-in-part of application No. PCT/EP2007/007584, filed on Aug. 30, 2007.

(30) Foreign Application Priority Data

Aug. 30, 2006 (NL) ..................... 1032384

(51) Int. Cl.
  *A01G 13/00* (2006.01)
(52) U.S. Cl. ..................................... 47/57.7
(58) Field of Classification Search ............... 47/1.01 P
  See application file for complete search history.

(56) References Cited

U.S. PATENT DOCUMENTS

| | | | |
|---|---|---|---|
| 3,091,197 A | 5/1963 | Henry | |
| 6,820,367 B2 * | 11/2004 | Poirier et al. | 47/1.01 P |
| 6,834,461 B2 * | 12/2004 | Poirier et al. | 47/1.01 P |
| 2004/0049974 A1 | 3/2004 | Poirier et al. | |
| 2009/0241414 A1 * | 10/2009 | Van Adrichem | 47/57.5 |

FOREIGN PATENT DOCUMENTS

GB  2 058 532  4/1981

* cited by examiner

*Primary Examiner* — Francis T Palo
(74) *Attorney, Agent, or Firm* — Vedder Price P.C.; Thomas J. Kowalski; Heidi Lunasin

(57) ABSTRACT

The invention relates to a method and device for administering at least one substance to a plant or plant material, comprising of: (i) providing at least one substrate with a surface and at least one plant location therein; (ii) providing injecting means; (iii) moving the substrate and the injection means relative to each other; (iv) controlling an alignment of the injecting means relative to the plant location; and (v) injecting the substance at the position of the plant location using the injecting means.

16 Claims, 2 Drawing Sheets

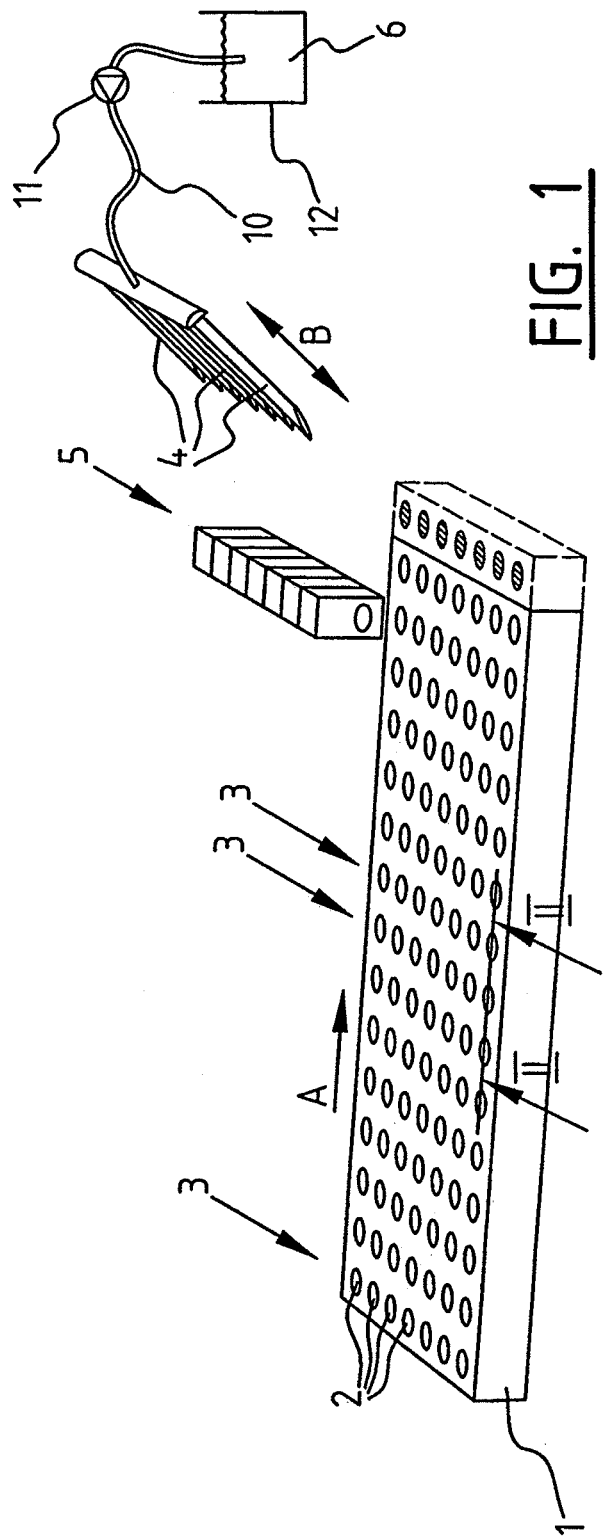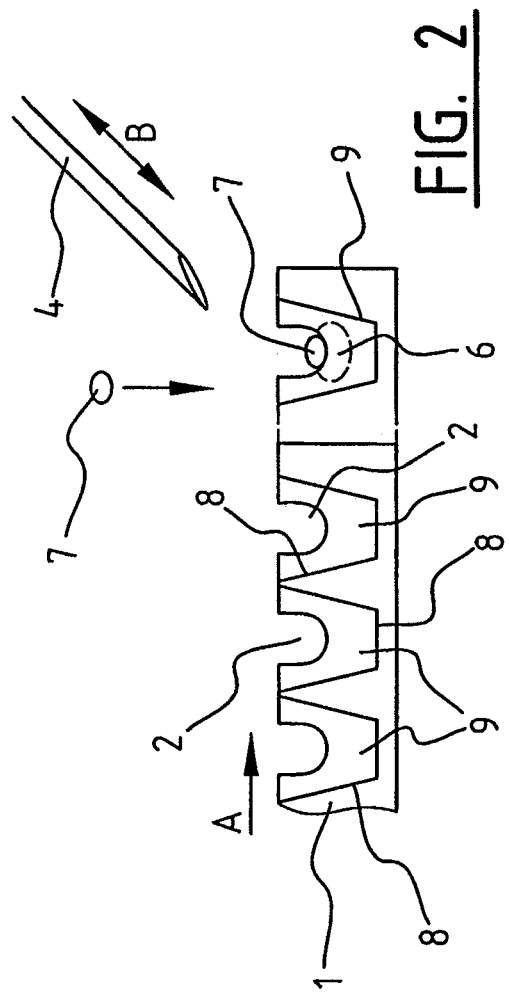
FIG. 1
FIG. 2

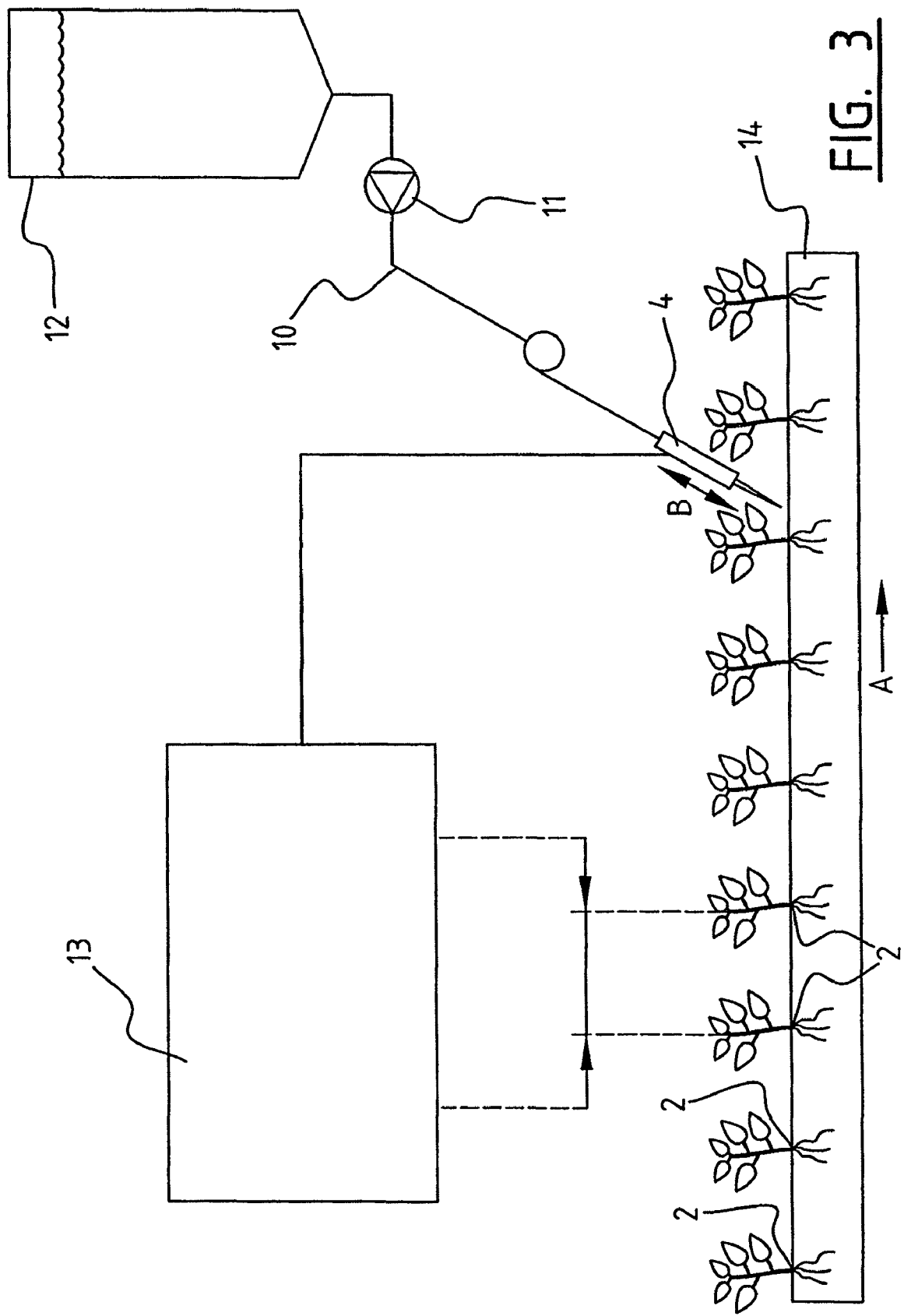

ADMINISTERING SUBSTANCES TO PLANTS BY INJECTION INTO THE SUBSTRATE

INCORPORATION BY REFERENCE

This application is a continuation-in-part of International Patent Application Serial No. PCT/EP2007/007584 filed 30 Aug. 2007 which published as PCT Publication No. WO 2008/025548 on 6 Mar. 2008 which claims the benefit of priority to Dutch Patent Application Serial No. 1032384 filed 30 Aug. 2006.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF THE INVENTION

The present invention relates to a method and a device for administering at least one substance, or treatment agent, directly to or in close proximity to a plant or plant material, thereby providing a highly efficient and accurate means of delivery, avoiding surface contamination of the plant material and minimizing substance waste.

BACKGROUND OF THE INVENTION

The present invention relates to a method and a device for administering at least one substance, or treatment agent, directly to or in close proximity to a plant or plant material. Such substances include, but are not limited to, seeds, crop protection agents, growth enhancers, root hormones, fungicides, insecticides, herbicides, nematocides, treatment agents, or any mixture thereof.

Typically, a substance is administered to the plant or plant material by spraying, dripping or depositing the substance onto the plant material or onto the ground (substrate) where plant material is set or planted. This method of administration from a distance is highly inefficient: it involves considerable loss of the substance, a large quantity of the substance must be administered for it to be effective, and it may result in inaccurate administration of the substance on the plant or plant material or on an unintended location other than the plant or plant material. Much of these problems resulting from administering a substance from a distance may be attributed to drift of the substance, for instance, on an air current. It is also difficult to prevent vapour formation, which is temperature-dependent and difficult to predict; as a result, the amount of liquid substance delivered to the plant, plant material or plant location is much lower than originally intended.

Furthermore, if there are already plants growing in or on the ground (substrate), their leaves may block access to the plant or plant material, thus affecting the accuracy of the dosage of substance or treatment agent administered to said plant or plant material.

There is also a problem of contamination on the surface of the plant material when a substance is administered from a distance.

Another means of administering a substance to a substrate is to inject the substance into fertilizer and then distribute the fertilizer over a field or meadow. This method is problematic in that an accurate dosage of a substance and an accurate location for delivery of the substance to a plant material cannot be controlled. Injected fertilizer is distributed evenly over a field or meadow, thus the substance is wastefully distributed to locations that will not receive plant material.

It would, therefore, be useful to have an alternative, more efficient and accurate means of administering a substance to plant material, which avoids surface contamination of the plant material and minimizes substance waste.

Citation or identification of any document in this application is not an admission that such document is available as prior art to the present invention.

SUMMARY OF THE INVENTION

Described herein is a means of administering to a plant, plant material or plant location by injection a substance under the surface of plant or plant material or under the surface of the plant location, thereby maximizing the effects of said substance, improving accuracy of delivery and dosage of said substance, avoiding harmful contamination on the surface of the plant, and minimizing substance waste.

In one embodiment the substance may be injected into the substrate of the intended plant location before the arrival of the plant or plant material. The substance may be injected into the substrate immediately after the pressing of "soil blocks" or immediately after the filling of a tray with a substrate. Alternatively, the substance may be injected into the substrate that has been placed in rockwool pots, coco-pots, pre-filled paper pots, and any other container that may be used to house plant material.

In another embodiment the substance may be injected into the substrate of the intended plant location after the arrival of the plant or plant material, even if the plant or plant material has been growing for any period of time.

In yet another embodiment the substance may be injected directly into the plant or plant material either before or after the arrival of the plant or plant material at the plant location, even if the plant or plant material has been growing for any period of time.

In another embodiment, the accuracy of the dosage of substance delivered to the plant, plant material or plant location may be improved as compared to methods that do not use the present invention.

In yet another embodiment of the invention, substance waste may be minimized as a result of the improved dosage accuracy.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by the following Detailed Description.

BRIEF DESCRIPTION OF THE DRAWINGS

The following detailed description, given by way of example, but not intended to limit the invention solely to the specific embodiments described, may best be understood in conjunction with the accompanying drawings, in which:

FIG. 1 shows schematically a perspective view of an embodiment of the present invention.

FIG. 2 shows a cross-sectional view along the line II-II in FIG. 1.

FIG. 3 shows schematically a side view of another embodiment of the invention.

DETAILED DESCRIPTION

Several embodiments of the present invention are described herein with reference to the accompanying figures.

As used herein, 'plant material' refers to seeds, seedlings, or cuttings of a plant.

"Plant location" refers to any location having a substrate material to which a plant or plant material will be planted in or set on, such as, for example, but not limited to, the ground, rockwool pots, coco-pots, pre-filled paper pots, and any other container that may be used to house plant material.

"Substrate" refers to any material in which or on which a plant is planted or set, such as, for example, but not limited to, rockwool, soil, cultivated soil, dirt, fertilizer, clay, potting compost, coconut fibre, bark, artificial substrate, and any mixture thereof and any 'plant location'. It is understood that in many instances 'plant location' and 'substrate' may be used interchangeably.

"Substance" refers to seeds, crop protection agents, growth enhancers, root hormones, fungicides, insecticides, herbicides, nematocides or any treatment agent that may be administered to a plant or plant material and any mixtures thereof.

"Synthetic material" refers to any plastic (e.g. acrylic, polyester, silicone, polythene, polystyrene, polyurethane) or styropor material.

FIG. 1 shows an embodiment in which a tray (1) may be manufactured from synthetic material. The plant locations (2) may be defined within the surface of the tray (1). The tray (1) may house cavities (8) at the plant locations, which may be filled with substrate material for forming plugs (9). For example, recesses in plugs (9) may define plant locations (2). After the initial growth phase of a plant or plant material and when said plant or plant material has developed sufficiently, these plugs may be taken out of tray 1 and placed in a substrate block (not shown) or other substrate.

The plant locations (2) may be arranged in the surface of the tray (1) in rows (3) with one or more plant locations per row (3). In the embodiment depicted in FIG. 1, there are seven plant locations per row (3).

Injectors (4) may be used for delivering substances in the form of liquid treatment agent (6), and release elements (5) may be used for delivering seeds. Droplets of a substance (6), as well as grain or powder forms of a substance, may be used.

In one embodiment the injectors (4) may be connected via conduits (10) having a pump (11) therein to a reservoir (12) for the substance (6).

The tray (substrate) (1) may be displaced with plugs (9) in the tray (1) at plant locations (2) by transport means (not shown) in the direction of arrow A relative to the injectors (4) and release elements 5, which may be per se stationary and form part of a device for implementing the method according to the present invention. Such a device, of which only injectors (4) and release elements (5) are shown herein in FIG. 1, may take a mobile form. Substrates (1) may not herein pass below injectors (4) and release elements (5), but injectors (4) and release elements (5) may themselves be disposed for travel on a frame and displaced or pulled across a field, or the open ground, or other stationary substrate. In a further embodiment, the invention may provide for levelling of the ground and the forming of holes therein corresponding to plant locations (2) as they are shown in FIG. 1.

In another embodiment, the movement of the tray (1) under the injectors (4) and release elements (5) may be uninterrupted. This is possible if the injectors (4) can deliver a substance (6) with sufficient speed in, under or close to the plant location. The control of the release elements may then require great precision; the substance (6) and seed (7) preferably comes to be in, on or close to a plant location. In one embodiment, the movement of the tray in the direction of arrow A may progress intermittently, and interrupted if the injectors (4) are directed in a desired manner at the plant locations (2) to effectively enable the substance (6) to be injected in or under the plant locations (2) and/or to deposit a seed (7) to the plant location.

As shown in FIG. 2, the tray (1) may be displaced in the direction of arrow A. (Rows of) plant locations (2) herein may move in each case under the injectors (4) or at least in line with the direction of movement of the injectors (4), schematically designated with double arrow B. By driving the injectors (4) reciprocally in the direction of double arrow B, the substance (6) may be injected into the plugs (9), preferably precisely below the plant locations (2). Using the release elements (5), seeds may be deposited simultaneously, or earlier or later, in the plant locations (2). Injectors (4) for the substance (6) and release elements (5) for seeds may be located some distance relative to each other in the direction of movement of arrow A. This may preferably be taken into account when it is desired that substance (6) and a seed (7) come to be successively or simultaneously in one of the plant locations (2). The drop speed and air resistance of seeds (7) may also be taken into account here in order to have the injectors (4) and release elements (5) driven by means of a control on the basis of these differences in position between the release elements (5) and plant locations (2) and drop characteristics of the seeds (7).

In another embodiment, the substance (6) may be first injected into a plant location (2) formed by a hole in the plugs (9), followed by a seed (7). It is, however, possible, taking into account for instance legislation, etc., to reverse this sequence. The seed (7) may then be deposited first, followed by injection of the substance (6), so that there is or may be no pre-treatment of the plugs (9) prior to depositing of the seed (7).

A highly automated process may be possible with the present invention, which may be very favourable from a cost viewpoint. It may be unnecessary to purchase and use pre-coated seeds (7), which are relatively expensive.

In addition, very little substance (6) is wasted, which typically occurs with spraying or dripping of the substance (6) onto the plant, plant material or plant location The presently claimed invention may account for positional differences of the release elements (5) relative to the plant locations as well as the differences in the drop characteristics and paths of the individual sowing and/or the plants or plant material, for instance seeds, cuttings, etc. By taking all these factors into account, it is possible to ensure that the intended dosage of the substance (6) is injected into each plant location (2) in combination with sowing and/or the plants or plant material.

In another embodiment, a substrate mat (14) is used (FIG. 3). Plant locations (2), where cultivation of plants or plant material (15) takes place, may be distributed over the surface of substrate mat (14). Plants (15) are shown in FIG. 3, but it is also possible within the scope of the invention for plants (15) to be planted or set at or close to the point in time at which injectors (4) deliver a substance to the substrate mat (14). In a preferred embodiment, the plants (15) may already be planted or on substrate mat (14) for any period of time before the injection. The substance (6) may thus be administered to the plants or plant material (15) after the plants or plant material have been stored for any period of time and before they are exposed to possibly harmful influences, for instance, when the tray or substrate mat (14) with the plants (15) grown therein is delivered by a grower to a market gardener.

A measuring module (13) is herein provided, which indicates when plant locations (2) are situated close to an injector (4). At the appropriately determined moment, this moment being determined or prompted by the measuring module (13) or another embodiment of a control, the injector (4) may deliver a precise dose of the substance (6) into the substrate mat (14), in which the plant locations (2) are defined, at some distance beneath the surface thereof. The substance comes from a reservoir (12) and may be carried to the injectors (4) via a conduit (10) having a pump (11) therein. At a correct or desired alignment of the injector (4) relative to the plant location (2), the injector (4) may be moved reciprocally by a drive (not shown) in the direction of double arrow B, preferably under the control of measuring module (13) or another type of control. The timing may be of importance, possible crucial importance, when the substrate mat (14) and the injector (4) move relative to each other, this being designated in the figure with arrow A.

Many alternative and additional embodiments may occur to the skilled person after examination of the foregoing, all of which fall within the scope of protection according to the appended claims unless such embodiments depart from the letter or spirit of these claims. In one embodiment, the rows (3) may contain individual soil blocks. The plant locations are then formed in the individual soil blocks. Each soil block may then be deemed in each case as one substrate with a single plant location.

In another embodiment, injectors (4) and/or release elements (5) for specimens of the sowing and/or the plants or plant material are not limited to a downward orientation.

Droplets with a substance (6) may also be "fired" into the plugs (9) and injected into, under or close to the plant locations (2), before a seed (7) lands in a plant location (2). In yet another embodiment, the injectors (4) and release elements (5) may be combined in order to inject a substance (6) into the plugs (9) at approximately the time of release of one specimen of the sowing and/or plant or plant material. The time taken for injecting and depositing may thus be minimized. Release elements (5) then, for instance, co-displace up and downward with the injectors (4). In yet another embodiment, the seed (7) is deposited first, follow with injection of a substance (6).

In some embodiments the distance between the injectors (4) and release elements (5) may be increased. In such instances, synchronization of seed (7) deposition at a plant location and the injection of a substance (6) are not necessarily under the control of the injectors (4) and release elements (5). Instead, the synchronization takes into account the distance traveled by the plant location between injection of the substance (6) and deposition of the seed (7).

In another embodiment, injection may also be applied when the seed (7) has already been sown or when the plants or plant material have already been set or planted or when the plant or plant material is already developing, for instance, at the moment when the young plants or plant material are ready to be supplied by the plant grower to the market gardener.

In yet another embodiment, a substance may also be delivered by injection directly into a plant or plant material.

The invention is further described by the following numbered paragraphs:

1. A method for administering to a plant or plant material at least one substance, comprising:
   (a) providing at least one substrate with a surface and at least one plant location therein;
   (b) providing injecting means;
   (c) moving the substrate and the injection means relative to each other;
   (d) controlling an alignment of the injecting means relative to the plant location; and
   (e) injecting the substance at the position of the plant location or to the plant or plant material using the injecting means,
   wherein said substance is injected under said surface or into said plant or plant material from above said surface or said plant or plant material;
   characterized by providing a measuring module arranged to indicate when the at least one plant location, plant or plant material is situated close to the injecting means, and by determining a correct moment by said measuring module for said injecting of the substance.

2. The method according to paragraph 1, further comprising sowing, setting or planting the plant or plant material on or in the substrate at the plant location prior to, during or after injection.

3. The method according to paragraph 1, further comprising providing a series of substrates, at least a series of plant locations in a direction corresponding to the forward movement, and successively aligning the injecting means at the plant locations and repeatedly injecting the substance at discrete moments during the movement.

4. The method according to paragraph 3, further comprising interrupting the forward movement at least during injection.

5. The method according to paragraph 1, wherein the substance is selected from the group consisting of fungicide, pesticide, plant growth enhancer, bacteria, insecticides, herbicides, nematocides, treatment agents, and plant seeds.

6. The method according to paragraph 1, wherein the plant material is selected from the group consisting of plant cuttings, seeds, seedlings, and plants.

7. The method according to paragraph 1, wherein the substrate is selected from the group consisting of a plate-like material such as rockwool fibers, potting compost, coconut (fibers), plugs, soil, dirt, cultivated soil, soil blocks, bark, artificial planting material and any mixture thereof.

8. A device for administering to a plant or plant material at least one substance, said device being arranged to process a substrate with a surface and at least one plant location therein, said device comprising:
   (a) at least one injector to inject the substance at the position of the plant location; and
   (b) transport means to move the substrate and the at least one injector relative to each other;

wherein said at least one injector is arranged to inject said substance under said surface from above said surface, characterized in that said device further comprises a measuring module arranged to indicate when the at least one plant location is close to the injector and arranged to determine the correct moment for the injector to inject the substance into the substrate.

9. The device according to paragraph 8, characterized by at least one release element for depositing a seed in the at least one plant location.

10. The device according to paragraph 9, characterized in that the at least one injector and at least one release element are stationary and the transport means are arranged to displace the substrate.

11. The device according to paragraph 9, characterized in that the at least one injector and at least one release element are disposed for travel on a frame and the substrate is stationary.

12. The device according to paragraph 8, wherein the substance is selected from the group consisting of fungicide, pesticide, plant growth enhancer, bacteria, insecticides, herbicides, nematocides and plant seeds.

13. The method according to paragraph 8, wherein the plant material is selected from the group consisting of plant cuttings, seeds, seedlings, and plants.

14. The method according to paragraph 8, wherein the substrate is selected from the group consisting of a plate-like material such as rockwool fibers, potting compost, coconut (fibers), plugs, soil, dirt, cultivated soil, soil blocks, bark, artificial planting material and any mixture thereof.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for administering to a plant or plant material at least one substance, comprising:
    (a) providing at least one substrate with a surface and at least one plant location therein;
    (b) providing injecting means;
    (c) moving the substrate and the injection means relative to each other;
    (d) controlling an alignment of the injecting means relative to the plant location; and
    (e) injecting the substance at the position of the plant location or to the plant or plant material using the injecting means,
    characterized by providing a measuring module arranged to indicate when the at least one plant location, plant or plant material is situated close to the injecting means, and by determining a correct moment by said measuring module or another embodiment of a control for said injecting of the substance.

2. The method according to claim 1, further comprising sowing, setting or planting the plant or plant material on or in the substrate at the plant location prior to, during or after injection.

3. The method according to claim 1, further comprising providing a series of substrates, at least a series of plant locations in a direction corresponding to the forward movement, and successively aligning the injecting means at the plant locations and repeatedly injecting the substance at discrete moments during the movement.

4. The method according to claim 3, further comprising interrupting the forward movement at least during injection.

5. The method according to claim 1, wherein the substance is selected from the group consisting of fungicide, pesticide, plant growth enhancer, bacteria, insecticides, herbicides, nematocides, treatment agents, and plant seeds.

6. The method according to claim 1, wherein the plant material is selected from the group consisting of plant cuttings, seeds, seedlings, and plants.

7. The method according to claim 1, wherein the substrate is selected from the group consisting of a plate-like material such as rockwool fibers, potting compost, coconut (fibers), plugs, soil, dirt, cultivated soil, soil blocks, bark, artificial planting material and any mixture thereof.

8. A device for administering to a plant or plant material at least one substance, said device being arranged to process a substrate with a surface and at least one plant location therein, said device comprising:
    (a) at least one injector to inject the substance at the position of the plant location; and
    (b) transport means to move the substrate and the at least one injector relative to each other;
    characterized in that said device further comprises a measuring module arranged to indicate when the at least one plant location is close to the injector, wherein said measuring module or another embodiment of a control is arranged to determine the correct moment for the injector to inject the substance into the substrate.

9. The device according to claim 8, characterized by at least one release element for depositing a seed in the at least one plant location.

10. The device according to claim 9, characterized in that the at least one injector and at least one release element are stationary and the transport means are arranged to displace the substrate.

11. The device according to claim 9, characterized in that the at least one injector and at least one release element are disposed for travel on a frame and the substrate is stationary.

12. The device according to claim 8, wherein the substance is selected from the group consisting of fungicide, pesticide, plant growth enhancer, bacteria, insecticides, herbicides, nematocides and plant seeds.

13. The method according to claim 8, wherein the plant material is selected from the group consisting of plant cuttings, seeds, seedlings, and plants.

14. The method according to claim 8, wherein the substrate is selected from the group consisting of a plate-like material such as rockwool fibers, potting compost, coconut (fibers), plugs, soil, dirt, cultivated soil, soil blocks, bark, artificial planting material and any mixture thereof.

15. The method according to claim 1, wherein said substance is injected under said surface or into said plant or plant material from above said surface or said plant or plant material.

16. The device of claim 8, wherein said at least one injector is arranged to inject said substance under said surface from above said surface.

* * * * *